March 6, 1934.  B. N. PIERCE  1,949,580
FILLING AND MEASURING MACHINE
Filed Nov. 25, 1929  4 Sheets-Sheet 1
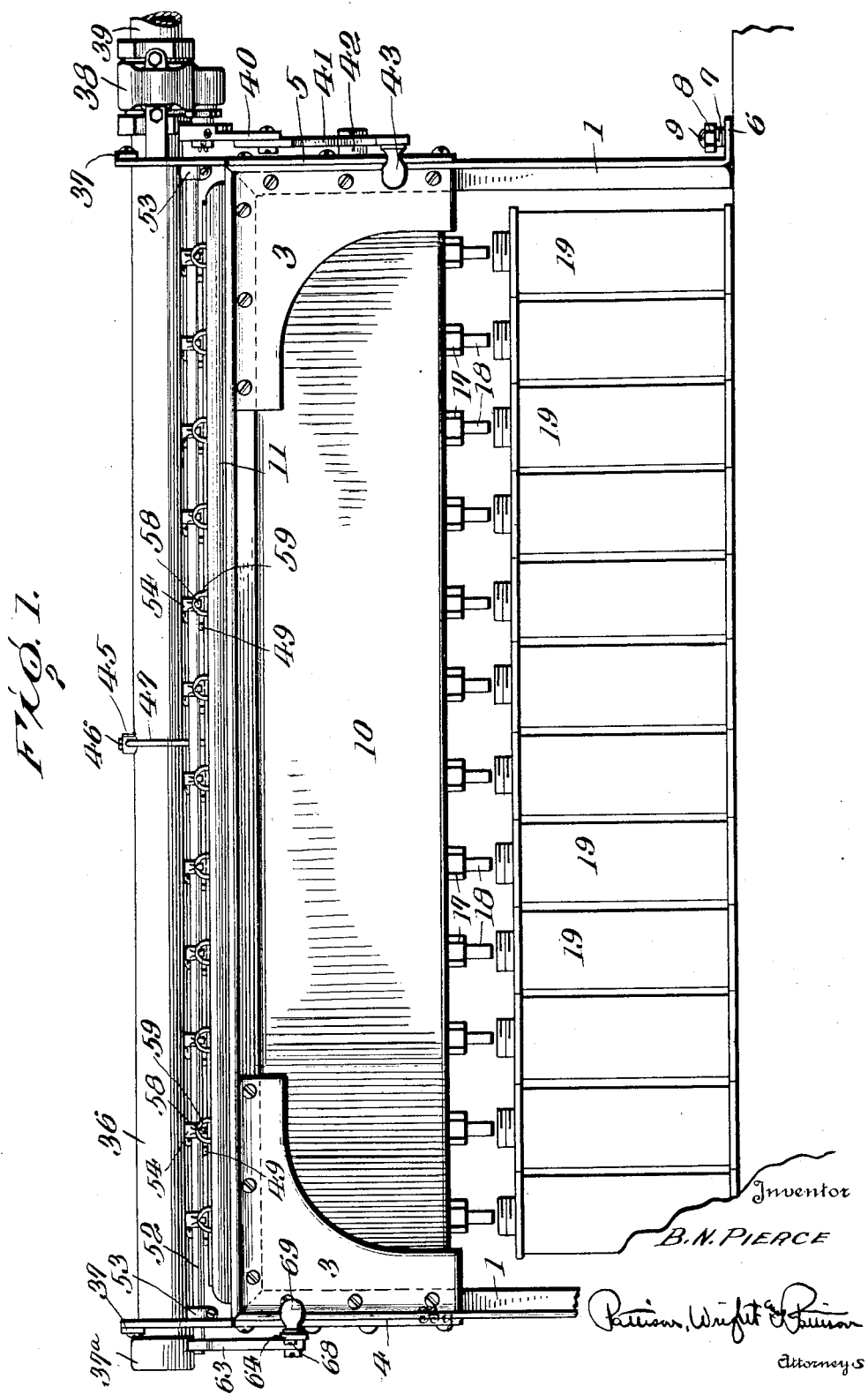

March 6, 1934.   B. N. PIERCE   1,949,580
FILLING AND MEASURING MACHINE
Filed Nov. 25, 1929   4 Sheets-Sheet 2
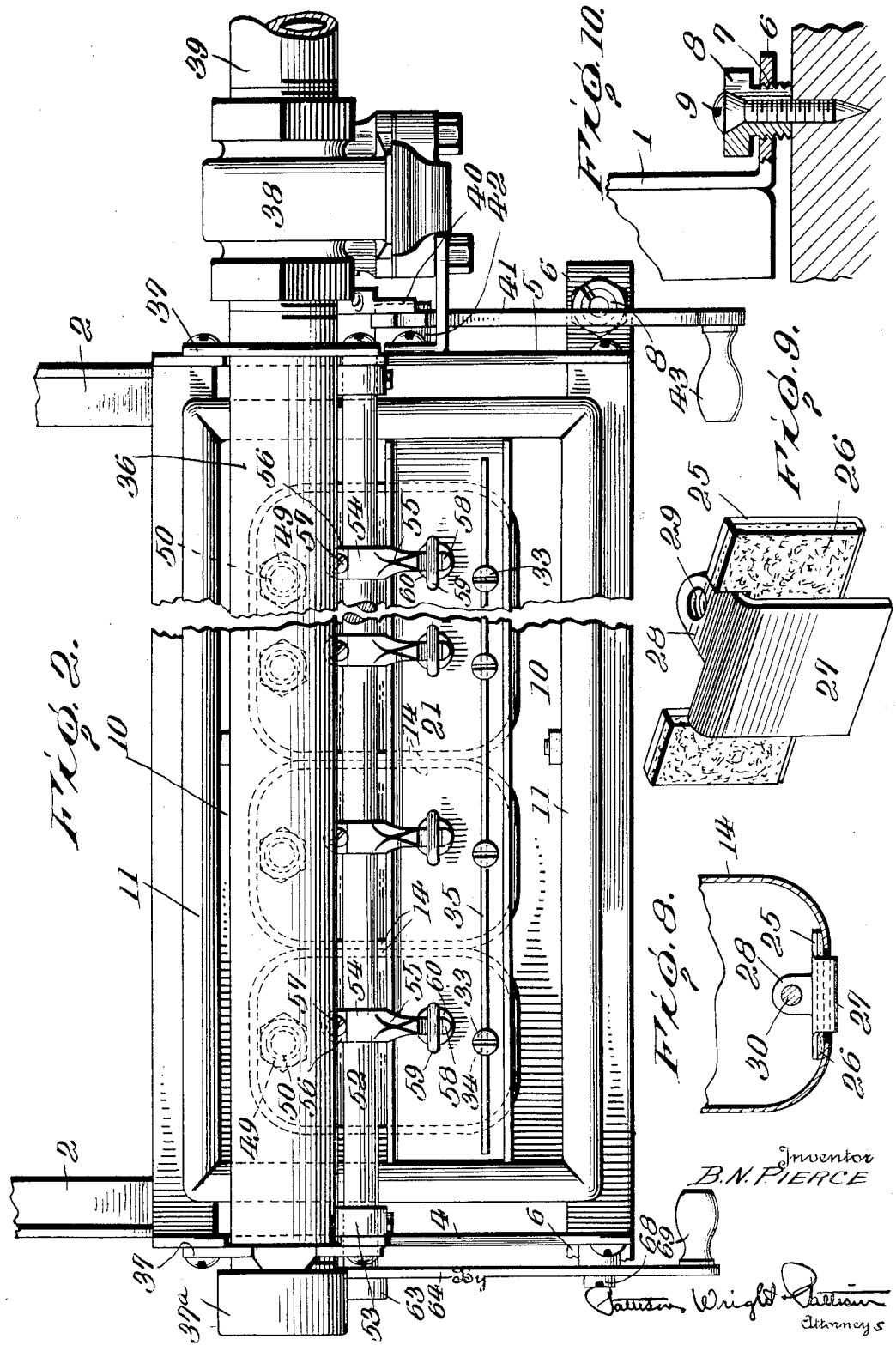

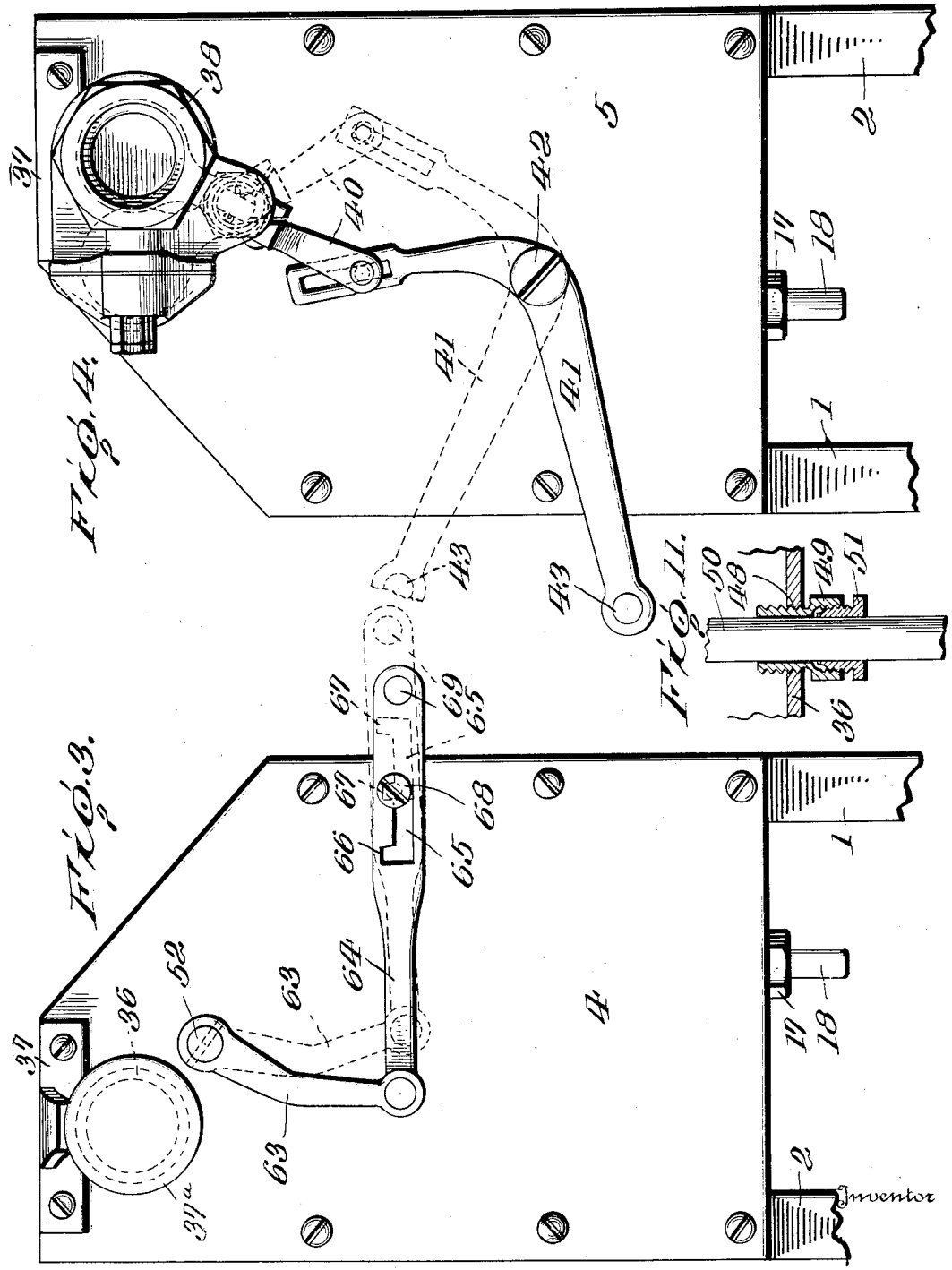

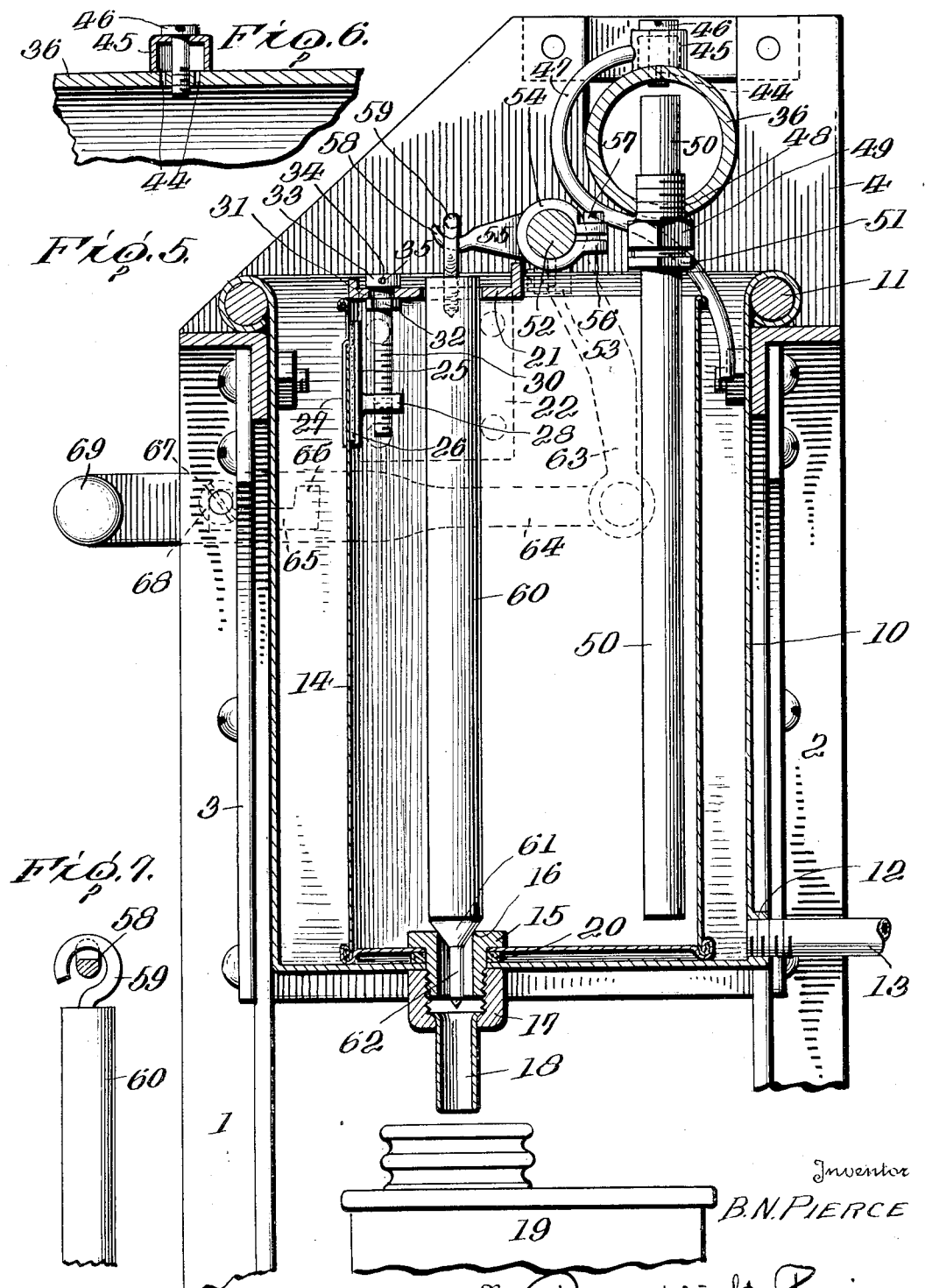

Patented Mar. 6, 1934

1,949,580

UNITED STATES PATENT OFFICE 1,949,580

FILLING AND MEASURING MACHINE

Burt Neulon Pierce, New York, N. Y.

Application November 25, 1929, Serial No. 409,621

11 Claims. (Cl. 226—105)

This invention relates to certain new and useful improvements in filling and measuring machines especially adapted for filling receptacles such as cans, the object being to provide a machine with a plurality of measuring chambers, each provided with a valve controlled outlet under which are adapted to be arranged the receptacles to be filled, means being provided for simultaneously operating the valves so as to allow the contents of the measuring chambers to be discharged into the receptacles to be filled.

Another object of the invention is to provide a machine with a main supply pipe having independent outlets for filling each measuring chamber, means being provided for venting the main supply pipe to prevent the siphoning of the liquid between the measuring chambers so that an accurate predetermined amount of liquid will be maintained within each measuring chamber.

Another object of the invention is to provide each measuring chamber with an adjustable overflow so that each overflow can be set or adjusted in order that each measuring chamber will contain a predetermined quantity of liquid, means being provided for sealing or locking the overflow after having been adjusted so that an authorized inspector of weights and measures after inspecting the machine can seal the overflow.

A further object of the invention is to provide each measuring chamber with a valve which is held to its seat by gravity and lifted from its seat by a rocker arm so that flexibility between the operating means and the valve is obtained in order to allow the valve to form a perfect seat in order to close the outlet of the measuring chambers.

A further object of the invention is to provide novel means for operating the rocker arms to operate the valves, means being provided for locking the operating means so that the valves will remain on their seats or be held off their seats in order to provide means for preventing the valves from moving after being adjusted into either an open or closed position.

A further object of the invention is to provide means for adjustably supporting the frame of the machine in order to allow the same to be leveled whereby the proper amount of liquid will be maintained in each of the measuring chambers.

Other and further objects and advantages of the invention will be hereinafter set forth and the novel features thereof defined in the appended claims.

In the drawings,

Figure 1 is a side elevation of a filling and measuring machine constructed in accordance with my invention showing a plurality of receptacles arranged in position under the machine to be filled;

Figure 2 is a top plan view, partly broken away;

Figure 3 is an end view showing the means for locking the operating lever for controlling the position of the valves;

Figure 4 is an end view showing the means for operating the cut-off valve in the supply pipe;

Figure 5 is a vertical section through the machine, the legs being broken away;

Figure 6 is a detail section through a portion of the supply pipe showing the air vent;

Figure 7 is a detail view of one of the valves removed showing the lost motion between the valve and the rocker arm in order to allow the valve to firmly seat;

Figure 8 is a detail horizontal section through one of the measuring chambers showing the adjustable overflow;

Figure 9 is a perspective view of the overflow detached;

Figure 10 is a detail section through one of the feet of the legs of the frame showing the adjustable means for leveling the machine; and Figure 11 is a detail view showing the manner of connecting the supply pipes to the main supply.

In the embodiment of my invention as herein shown, the frame is composed of a pair of rectangular frame members 1 and 2 provided with corner braces 3 and connected together in spaced relation by end plates 4 and 5. The frames terminate in feet 6 as clearly shown in Figure 10 and are provided with threaded bores 7 in which are adjustably mounted threaded split apertured plugs 8 through which screws 9 are adapted to pass for securing the feet on the support and it will be seen that by adjusting these plugs, the frame can be leveled.

Arranged within the frame thus formed is a tank 10 having a bead 11 at its top resting on the flanged edges of the side frames as clearly shown in Figure 5 for supporting the tank firmly in the frame in such a manner that it can be readily inserted or removed. The tank is provided with an outlet 12 in which a pipe 13 is secured which is adapted to extend to any suitable tank for collecting the surplus of liquid as will be hereinafter fully described.

Arranged within the tank 10 is a plurality of measuring receptacles 14, which as herein shown are twelve in number so that twelve cans can be filled at one operation of the machine as will be hereinafter fully described. Each receptacle as herein shown is in the form of a can and a description of one of these cans will be sufficient for all as they are formed identically alike.

An opening is formed in the bottom of each can which is adapted to register with an opening formed in the bottom of the tank 10 and secured in this opening is a plug 15, the upper edge of which forms a valve seat 16 to receive the valve as hereinafter fully described, said plug passing downwardly through the tank and having a hollow nut 17 screwed on the threaded lower end thereof, said hollow nut carrying a nipple 18 through which the liquid from the measuring chambers is adapted to be deposited in the receptacles 19 to be filled.

A packing washer 20 is disposed between the receptacle 14 and the bottom of the tank so as to form a tight joint and to support the bottom of the can in spaced relation to the bottom of the tank 10. Extending longitudinally of the tank is an inverted U shaped frame 21 which has its depending legs 22 secured to the end walls of the tank by any suitable means, such as screws or the like so as to support the frame in substantially the same plane as the upper edge of the various receptacles arranged therein.

Each of the tanks is provided with an overflow opening 23 in which is adjustably mounted an overflow 24 comprising a plate 25 having a packing 26 secured against one face thereof and a downwardly projecting spring arm 27 so as to force and hold the packing firmly against the inner wall of the receptacle over the overflow opening as clearly shown in Figures 5 and 8.

The plate 25 is provided with a laterally projecting lug 28 having a threaded aperture 29 through which extends an adjusting screw 30, the upper end of which is loosely mounted in an opening 31 formed in the frame 21, said screw being locked in its adjusted position by a locking nut 32 and provided with a head 33 having a horizontally disposed bore 34 through which a sealing wire 35 is adapted to pass for sealing the adjustable overflow in its adjusted position, whereby the predetermined amount of liquid to be dispensed from the measuring chamber formed by the receptacle can be determined and fixed and as each of these measuring chambers is provided with an adjustable overflow, the wire 35 passes through the opening in the head of each of the adjusting screws so as to seal these various adjustable overflows whereby an inspector of weights and measures after testing the various measuring receptacles can seal the adjustable overflow so that he can be assured that an accurate quantity of liquid will be delivered from each measuring receptacle.

The end plates 4 and 5 of the main frame of the machine are provided with notches in the upper edges in which is arranged a supply pipe 36 which is secured in position by bars 37 extending across the upper edge of the notches and secured so as to clamp the supply pipe 36 firmly in position within the notches of the end plates, one end of the supply pipe being closed by a cap 37 and the other end being provided with a cut-off valve 38 so that the passage of fluid to the main supply pipe 36 can be controlled. The other end of the valve has a pipe 39 connected thereto extending to a gravity or a force feed supplying means.

The valve 38 is provided with an operating handle 40 slidably connected to the free end of an operating lever 41 pivotally mounted at 42 on the end plate 5 of the main frame and the lever 41 is provided with a handle portion 43 which extends in advance of the machine so that it can be readily manipulated by the operator whereby the supply of fluid to be dispensed can be controlled to a nicety. While I have shown a particular construction of valve, it is, of course, understood that various changes can be made in the construction of cut-off valve without departing from my invention, but I have found that by providing a swinging gate valve that the supply of fluid can be controlled by the operator in order to regulate the flow of fluid to a nicety.

In order to prevent siphonic action between the measuring chambers 14 through 50 and 36, I provide pipe 36 with a pair of spaced openings 44 over which is arranged a hollow cap 45 secured in position by screw 46, said cap being provided with a vent tube 47 as shown in Figure 5, extending downwardly into the main tank 5 so as to vent the main supply pipe.

This vent allows air and oil to pass out of the main supply pipe 36 when the main valve 38 is open and air to pass into the main supply pipe when valve 38 is closed in order to maintain the liquid in the outlet pipe 50 at the same level of the liquid in the measuring chambers 14.

The main supply pipe 36 is provided with a threaded aperture 48 over each of the measuring chambers in which is secured a threaded nipple 49 through which passes a pipe 50 locked in its adjusted position within the nipple by a clamping nut 51 so that the pipe 50 can be adjusted within the main supply pipe and it will be seen that the fluid is delivered from the main supply pipe to the bottom of each measuring chamber and that by extending the pipe 50 into the main supply pipe 36, the atmospheric pressure on the liquid allows the level in 50 to drop to the level in the measuring receptacle 14. This provides independent means for supplying each measuring chamber with fluid from the main supply and delivering said fluid to the bottom of the measuring chamber in order to prevent foaming.

The end plates 4 and 5 are provided with openings forming bearings for rock shaft 52 which is held in position within said opening by clamp collars 53 and adjustably mounted on said rock shaft 52 over each receptacle is a split collar portion 54 of a valve actuating arm 55, said split collar being provided with apertured threaded ears 56 through which a screw is adapted to pass for clamping said collar in adjusted position on said rock shaft whereby each arm can be adjusted in respect to the eye of the valve that it operates to enable the valve to obtain a perfect seat without undue lost motion.

The valve actuating arm 55 is provided with a reduced end 58 adapted to extend through eye 59 carried by the upper end of valve 60 which is provided with a conical portion 61 cooperating with the seat 16 and provided with depending pin portion 62 for preventing the valve from being displaced as it is moved up and down. The upper end of the valve is loosely mounted in an opening formed in the frame 21 and by having a loose connection between the valve, and the valve actuating arm, a free movement is obtained for the valve as it rises and lowers so that the valve will form a perfect seat when in closed position.

As shown in Figure 5, when the valve is seated, the valve actuating arm is spaced from the eye 59 of the valve in order to allow a perfect seat to be formed and as the rock shaft is oscillated, the valve is raised and as it is raised, the outlet opening is opened in order to allow the contents of the measuring receptacle to be discharged through the dispensing nozzle into the can to be filled, the vertical movement of the valve being limited by the valve actuating arm and by the particular construction of valve with a depending pin portion 62, the valve is prevented from being raised to such a height that the pin 62 will be drawn out of the plug 15. This provides a flexible valve construction and allows quick opening and closing of the valve.

One end of the rock shaft 52 extends outwardly beyond the plate 4 and has fixed thereon a crank arm 63 to the free end of which is pivotally connected a slidably mounted operating member 64 which is provided with a slot 65 terminating in a notch 66 at one end and a notch 67 at its other end. The end plate carries a screw 68 working in the slot and adapted to cooperate with the notches 66 and 67 in order to hold the valve in an open or closed position. The operating member 64 is provided with a handle 69 at its free end arranged in such position that it can be readily grasped by the operator so as to move the arm inwardly and outwardly in order to rock the rock shaft which in turn raises and lowers the valve in order to open and close the outlets to the measuring receptacle.

By this construction it will be seen that as the operating member 64 is moved in one direction, the valves will rise off their seats and when moved in an opposite direction the valve actuating arms are lowered so as to allow the valves to seat themselves. By having the notches 66 and 67 arranged as shown in Figure 3 at the extreme movement of the operating member in either direction the rock shafts will be held so as to hold the valves in closed or open position. By this construction, the valves are locked when seated so as to prevent any possibility of leakage and are locked unseated so as to allow the contents of the measuring receptacle to be drained therefrom.

In the operation of a filling machine as herein shown and described, I have shown a machine constructed to fill twelve containers in one operation, these containers being shown in the form of cans and arranged under the outlet nipples of the measuring receptacles. After the cans have been placed in position, the lever 41 is operated so as to open the valves and allow the liquid from the source of supply to enter the main supply pipe 36 and as this pipe 36 fills up, the air therein escapes through the vent 47 and the liquid passes out through the respective pipes 50 into the various measuring chambers where it rises until it overflows the adjustable overflow, it, of course, being understood that these overflows have been adjusted so that a predetermined quantity of liquid will be held within the measuring chambers. The operator then cuts off the supply valve and operates the handle 69 so as to rock the rock shaft 52 and as the valve actuating arms have been previously adjusted, the valve in each receptacle is raised off its seat and the contents of the measuring chambers is discharged into the cans arranged under the machine. The operator then operates the handle 69 so as to rock the rock shaft 52 into such a position that the valves will drop by gravity in order to close the outlets of the measuring receptacle and the operation is repeated, it, of course, being understood that the cans as filled are removed and additional cans or containers are placed in position under the nipples 18 to receive the contents of the measuring chambers and on each operation the air vent allows the liquid in the outlet pipes 50 to drop to the level of the liquid in the measuring chambers.

From the foregoing description it will be seen that I have provided a filling and measuring machine in which a plurality of measuring chambers are provided, each chamber having an independent supply and an independent outlet, the independent supply being fed from a common source and the independent outlet being controlled from a common operating member so that the valves controlling the outlets of the measuring chambers will operate simultaneously in order to allow the contents of the measuring chambers to be discharged into the various containers to be filled.

It will also be seen that I have provided each measuring chamber with a novel form of adjustable overflow and that the main supply pipe is provided with means for venting the same.

What I claim is:—

1. In a liquid measuring device, the combination with a measuring chamber having an opening in one wall thereof, an adjustable overflow mounted in the opening of said chamber, said overflow comprising a substantially inverted U-shaped member embracing the walls of said chamber and means for raising and lowering said overflow.

2. In a liquid measuring device, the combination with a plurality of measuring chambers, each having an opening in one wall thereof, an adjustable overflow mounted in the opening of each of said chambers, each overflow comprising a substantially inverted U shaped member embracing the wall of said chamber and means for independently adjusting said overflow.

3. In a liquid measuring device, the combination with a plurality of measuring chambers, each having an opening in one wall thereof, an adjustable overflow mounted in the opening of each of said chambers, each overflow comprising a substantially inverted U shaped member embracing the wall of said chamber, means for independently adjusting said overflow and means for sealing said adjusting means.

4. In a liquid measuring device, the combination with a plurality of measuring chambers, each having an opening in one wall thereof, an adjustable overflow mounted in the opening of each of said chambers, each overflow comprising a substantially inverted U shaped member embracing the wall of said chamber, means for independently adjusting said overflow and means for connecting said adjusting means together.

5. In a liquid measuring device, the combination with a receptacle, of a plurality of measuring chambers arranged in said receptacle, each being provided with an outlet having a valve seat, a rock shaft, a plurality of independently adjustable arms mounted on said rock shaft provided with hooks at their ends, a plurality of valves provided with eyes mounted on the respective hooked ends of said arms cooperating with said valve seats, an arm for rocking said shaft and a stud carried by said receptacle, an operating arm having a slot provided with a notch at each end slidably mounted on said stud and pivotally connected to said arm for rocking said shaft and locking said shaft in adjusted position.

6. In a liquid measuring device, the combination with a receptacle, of a plurality of measuring chambers mounted in said receptacle, each having an outlet extending through said receptacle, a supply pipe provided with a plurality of outlet pipes terminating adjacent the upper wall of said supply pipe at their upper ends extending into said receptacle and terminating adjacent the bottom thereof and means for venting said supply pipe to maintain the liquid in the outlet pipe at the same level of the liquid in the measuring chambers.

7. In a liquid measuring device, the combination with a receptacle, of a plurality of measuring chambers arranged in said receptacle, each measuring chamber being provided with an outlet extending through the bottom of said receptacle, a rock shaft mounted above said receptacle, a plurality of arms adjustably mounted on said rock shaft, each of said arms being provided with a hook at its end, a plurality of valves having eyes loosely mounted on the hooked ends of said arms, said valves being adapted to close the outlets of said chambers, a main supply pipe, an outlet in said supply pipe extending into each of said measuring chambers, a valve controlling the supply of liquid through said main supply pipe, an arm for rocking said rock shaft and a movably mounted operating bar pivotally connected to said arm and having means for locking said arm in adjusted position.

8. In a liquid measuring device, the combination with a measuring chamber having a valve controlled outlet and an adjustable overflow, of a main supply pipe, an outlet pipe adjustably mounted in said main supply pipe extending into said measuring chamber terminating adjacent the bottom thereof, said supply pipe being provided with vent openings and a hollow cap secured over said openings having a vent tube extending therefrom to allow the liquid in the outlet pipe to drop to the level of the liquid within the measuring chamber.

9. In a liquid measuring device, the combination with a plurality of measuring chambers, provided with outlets, a rock shaft provided with a plurality of independently adjustable arms, a plurality of valves loosely supported by said arms cooperating with said outlets, a crank arm secured to said rock shaft, an operating lever secured to said crank arm having a slot provided with a notch at each end and a pin extending through said slot and adapted to cooperate with said notches for locking said rock shaft in adjusted position.

10. A liquid measuring device having a plurality of measuring chambers, a main supply pipe having a valve controlling the passage of liquid therethrough, said supply being provided with an outlet pipe for supplying liquid to each of said chambers, a vent for said main supply pipe for maintaining the liquid within the outlet pipe at the same level of the liquid within the chamber, an adjustable overflow for each of said measuring chambers, each of said measuring chambers being provided with an outlet, a valve for each of said outlets and common means for raising and lowering said valves.

11. A liquid measuring device comprising a measuring chamber provided with a valve controlled outlet, a main supply pipe, a pipe extending from said main supply and terminating adjacent the bottom of said measuring receptacle, said main supply being provided with vent openings, a hollow cap secured over said opening and a vent tube extending from said cap to allow atmospheric pressure to enter said supply pipe and maintain the liquid in the outlet pipe at the same level of the liquid within the measuring receptacle.

BURT NEULON PIERCE.